United States Patent [19]
Zoeller

[11] Patent Number: 5,762,790
[45] Date of Patent: Jun. 9, 1998

[54] SEPTIC TANK FILTERING SYSTEM

[75] Inventor: Kenneth E. Zoeller, Louisville, Ky.

[73] Assignee: Zoeller Co., Louisville, Ky.

[21] Appl. No.: 867,282

[22] Filed: Jun. 2, 1997

[51] Int. Cl.⁶ .......................... B01D 29/52; B01D 35/037; B01D 36/04
[52] U.S. Cl. .......................... 210/238; 210/311; 210/314; 210/295; 210/323.2; 210/460; 210/463; 210/532.2
[58] Field of Search .................. 210/238, 323.2, 210/532.2, 460, 463, 295, 314, 311

[56] References Cited

U.S. PATENT DOCUMENTS

| | | |
|---|---|---|
| 648,043 | 4/1900 | Miles . |
| 2,900,084 | 8/1959 | Zabel . |
| 3,332,552 | 7/1967 | Zabel . |
| 4,105,562 | 8/1978 | Kaplan . |
| 4,439,323 | 3/1984 | Ball . |
| 4,455,227 | 6/1984 | Harms . |
| 4,710,295 | 12/1987 | Zabel . |
| 5,207,896 | 5/1993 | Graves . |
| 5,264,120 | 11/1993 | Graves . |
| 5,382,357 | 1/1995 | Nurse . |
| 5,445,738 | 8/1995 | Fry . |
| 5,482,621 | 1/1996 | Nurse . |
| 5,492,635 | 2/1996 | Ball . |
| 5,569,387 | 10/1996 | Bowne et al. . |
| 5,580,453 | 12/1996 | Nurse, Jr. . |
| 5,582,716 | 12/1996 | Nurse, Jr. . |
| 5,591,331 | 1/1997 | Nurse, Jr. . |

*Primary Examiner*—Thomas M. Lithgow
*Attorney, Agent, or Firm*—Scott R. Cox

[57] ABSTRACT

A filtering system for filtering effluent in a septic system comprising a filter housing with sides, a top and an open bottom, a filter element holder secured within the filter housing, wherein the filter element holder contains a top and a side portion, a discharge opening in the filter housing located generally above the filter element holder for discharging filtered effluent from the filter housing, a plurality of filter elements, each secured to the filter element holder, each with a top, bottom and side, wherein the bottom of each filter element is closed to prevent flow of the effluent through the bottom of the filter element, wherein each filter element contains filtering slots for filtering solids contained in the effluent and a separation element for separating one filter element from other filter elements, which element does not significantly impede the flow of effluent through the filtering system.

17 Claims, 5 Drawing Sheets

SEPTIC TANK FILTERING SYSTEM

BACKGROUND OF THE INVENTION

1. Field of Invention

This invention relates to devices used for the treatment of waste water. More specifically, this invention relates to a filtering system used for the filtering of liquid effluent contained in a septic tank.

2. Prior Art

Waste water discharged from commercial or residential property contains both liquid and solid wastes which are typically collected in a waste water collector, such as a septic tank. In such septic tanks, the liquid and solids are generally distributed into three layers: an upper horizontal scum layer, a lower horizontal sludge layer, and a relatively clear, horizontal, liquid, effluent layer between the two other layers. During operation of the septic tank systems, liquids from this horizontal liquid, effluent layer are intermittently discharged from the septic tank. During such discharge the solids contained within the septic tank are preferably retained in the septic tank to be decomposed during the normal operation of the system. Intermittently, the septic tanks may be cleaned to remove any excess solids.

During normal operations, some solids become mixed into the relatively clear horizontal liquid, effluent layer. These solids often migrate into this layer on gas bubbles produced during decomposition of solid material contained in the lower sludge layer. These solids will be discharged with the effluent if not filtered out of the effluent. Excess solids discharged with the effluent may gradually degrade the effectiveness of the entire septic system.

To reduce the likelihood of discharge of solids from the septic system, a number of different types of filtering devices for the liquid effluent have been developed. For example, cylindrical mesh screen filtering systems which surround a gravity flow outlet system and discharge pump are disclosed in U.S. Pat. Nos. 5,207,896 and 4,439,323.

Other filtering devices which may be placed within a septic system which use a filtering system different from a mesh screen are disclosed, for example, in U.S. Pat. Nos. 5,482,621 and 5,382,357. These patents disclose filtration of the effluent using a specific flow for the effluent through an open bottom of the filter element, out the sides of the filter element an annular space adjacent to the filter element, and finally to the discharge opening of the device for discharging the filtered effluent from the septic system.

Another system for filtering solids from an effluent of a septic system utilizing a stacked disk dam system as the filtering system is disclosed in U.S. Pat. Nos. 5,582,716, 5,207,896, 4,710,295, 3,332,552 and 2,900,084. See also U.S. Pat. No. 5,264,120 which utilizes both a mesh screen and the disk dam system to filter the effluent.

U.S. Pat. No. 5,591,331 discloses a different filtering system comprising a plurality of vertically extending removable side walls, each of which contains a filtering screen for filtering the effluent.

A filter system containing a removable filter with diagonal slits for filtering effluent in a septic system is disclosed in U.S. Pat. No. 5,569,387.

In addition to systems which utilize a single filter element within a filter system, multiple filter element systems for filtering effluent in a septic system are disclosed in U.S. Pat. Nos. 5,580,453 and 5,492,635. Each of these patents mandates a specific flow pattern for the effluent entering the filter system and exiting through a discharge opening in the housing of the filter system.

Because of limitations on the flow of the effluent through these prior art systems, problems may arise from clogging of the filters which will necessitate frequent cleaning of the systems. In addition, some of the screen filter systems can collapse even in normal use, also necessitating cleaning and/or replacement.

Thus, a need exists for a more effective system for the filtering solids from the effluent of a septic system which overcomes the problems present in the prior art systems.

Accordingly, it is an object of this invention to disclose a filter system for filtering the effluent present in a waste water system.

It is a further object of this invention to disclose a filtering system for filtering effluent from a waste water system which contains a significant amount of filtering surface, thus reducing the likelihood of clogging of the filters during normal operation.

It is a further object of this invention to disclose a filtering system containing multiple filter elements which are easy to clean and replace, if necessary.

It is a still further object of this invention to disclose a filtering system utilizing multiple filter elements, which contains a means for separating each of the multiple filter elements, such that the flow of the effluent through the filtering system is unimpeded.

It is a further object of this invention to disclose a filtering system with an open bottom which permits a significant volume of liquid effluent to be filtered by the filtering system with a reduced likelihood of clogging of the filtering system.

These and other objects and features of the present invention will become apparent to those skilled in the art from a consideration of the following detailed description, drawings and claims. The description, along with the accompanying drawings, provides a selected example of construction of the device to illustrate the invention.

SUMMARY OF THE INVENTION

In accordance with the present invention there is provided a filtering system for filtering liquid effluent contained in a waste water system comprising (a) a filter housing with sides, a top and an open bottom, (b) a filter element holder secured to the inside of the filter housing, wherein the filter element holder contains a top portion and a lip portion, (c) a discharge opening in the side of the filter housing located generally above the filter element holder for discharging filtered effluent from the filtering system, (d) a plurality of filter elements, each secured to the filter element holder, each with a top, bottom and sides, wherein the bottom of each filter element is closed to prevent flow of effluent through said bottom of the filter element, and wherein each filter element contains a filtering means for filtering solids from the liquid effluent, and (e) a separation means, preferably a separation ring, for separating at least one of the filter elements from other filter elements, which means does not substantially inhibit the flow of liquid effluent through the filtering system. The filter element holder is secured against the inside surface of the filter housing to prevent effluent from being discharged through the discharge opening in the filter housing without first passing through the filter elements. Preferably, the filter elements comprise a central filter element and a plurality of surrounding filter elements, each separated from the central filter element by a separation ring secured to the central filter element. In a further preferred embodiment, additional separation rings are secured to a plurality of the surrounding filter elements such that during normal operation each filter element is separated from the other filter elements. By separating the various filter elements from each other, more efficient filtering of the effluent is accomplished, while not significantly limiting the flow of the liquid effluent through the filter elements.

BRIEF DESCRIPTION OF THE DRAWINGS

This invention will now be described with reference to the accompanying drawings in which:

FIG. 1a is a side view of a cut-away portion of one of the filtering elements.

DETAILED DESCRIPTION OF THE PREFERRED EMBODIMENT

Figure 1:
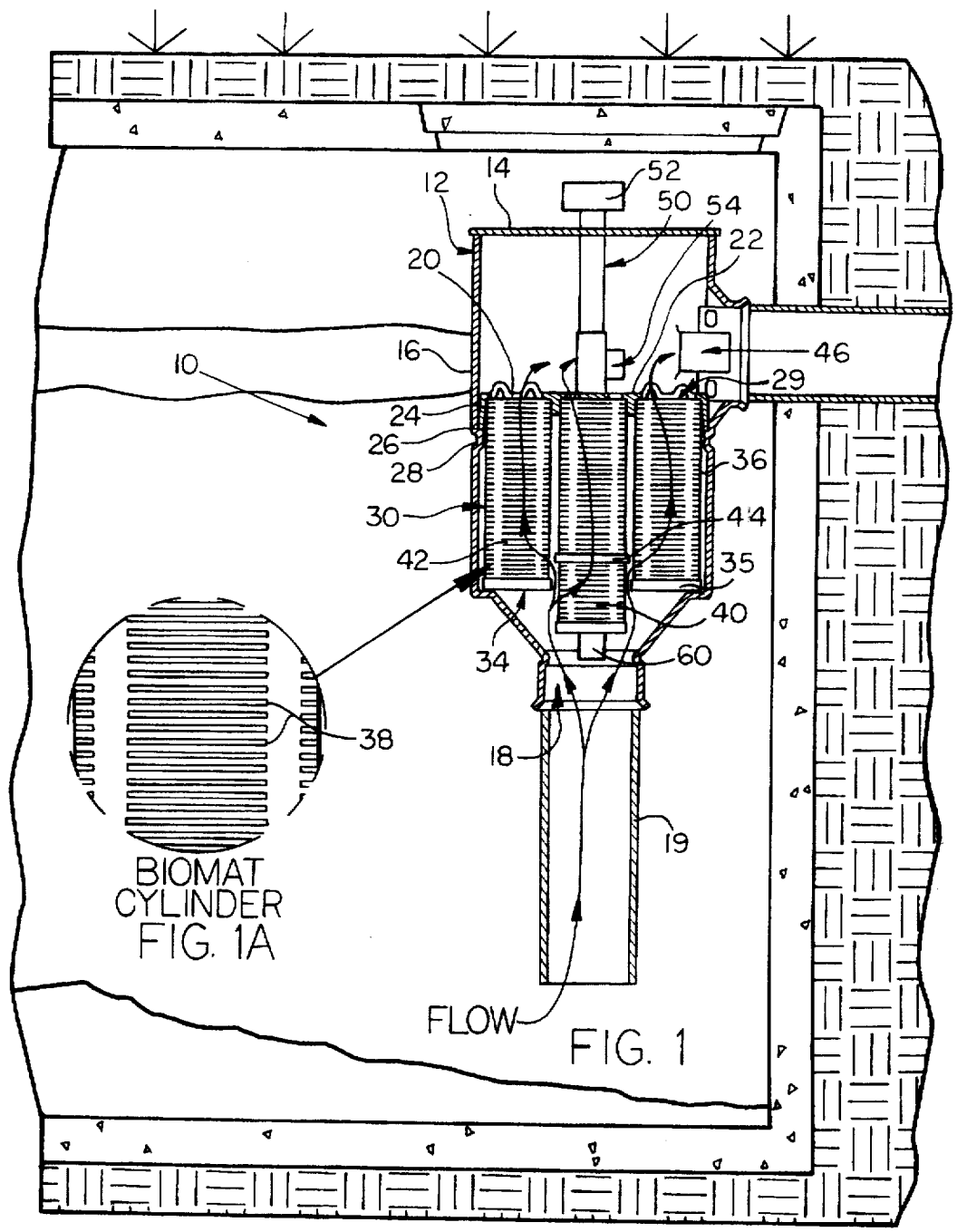
FIG. 1 is a cutaway side view of the filtering system.
Figure 2:
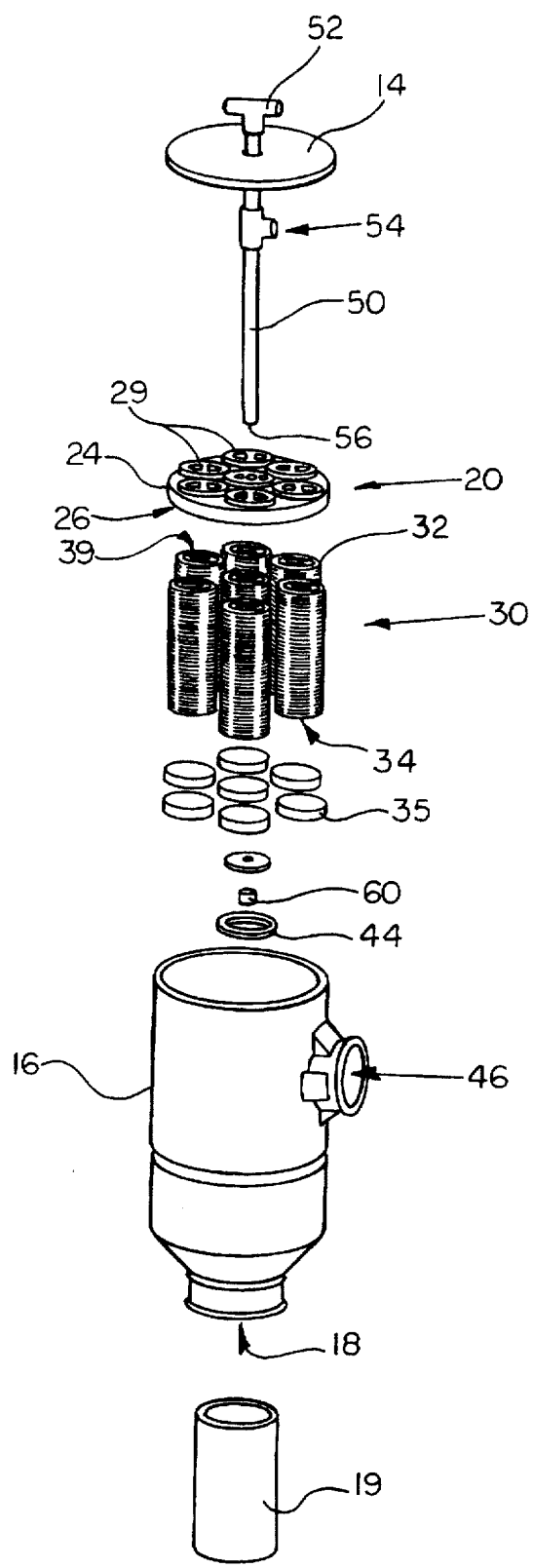
FIG. 2 is an exploded view of the filtering system.

Although the invention is adaptable to a wide variety of uses, it is shown in the drawings for purpose of illustration as embodied in FIGS. 1 and 2 in a filtering system (10) for filtering liquid effluent in a waste water system, preferably a septic tank system. This filtering system (10) is comprised of a filter housing (12), a filter element holder (20) secured within the filter housing (12), a plurality of filter elements (30) secured to the filter element holder (20), a separation means, preferably a separation ring (44) for maintaining at least one filter element apart from the other filter elements; and a discharge opening (46) in the filter housing (12) for discharging filtered liquid effluent from the filter housing (12), which opening is located generally above the filter element holder (20).

The filtering system (10) is utilized within a waste water collection container, preferably a septic tank. The septic tank typically receives raw sewage and waste water from a residence or commercial facility. During normal operation, solids received distribute into a lower sludge layer or an upper horizontal scum layer. Contained between these two layers is a generally liquid, effluent layer. The filtering system (10) is designed to filter the liquid, effluent layer to remove solids from the effluent so that filtered effluent may be discharged from the septic system through the discharge opening (46) for normal dispersion thereafter.

Figure 3:
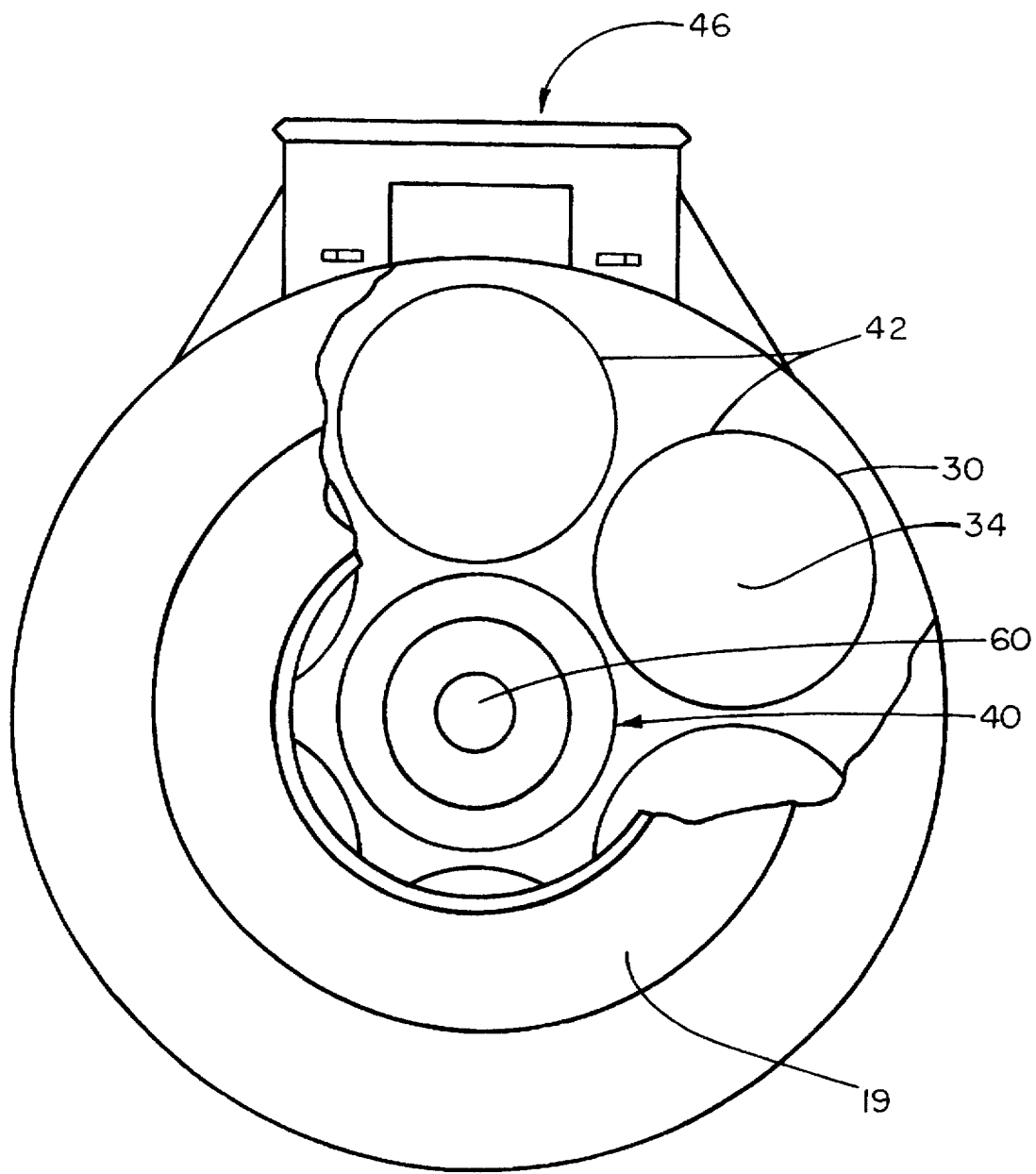
FIG. 3 is a bottom end view of the filtering system.

The filter housing (12) is a closed system except for an open bottom (18), as shown in FIGS. 1 and 3. In order to meet code requirements, an expansion piece (19) is frequently secured to the open bottom (18) of the filter housing (12), which piece is designed to extend a certain depth into the liquid, effluent layer. The length of this extension piece (19) is dependent upon local septic system regulations.

The filter housing (12) contains a top (14), sides (16) and the open bottom (18). The top (14) and sides (16) are closed to liquids outside the filtering system (10) to prevent effluent from entering the filtering system (10) except through the open bottom (18) of the filter housing (12). The discharge opening (46) is provided in the side (16) of the filter housing and is located generally above the filter element holder (20). This discharge opening (46) is designed to pass the filtered effluent out of the septic tank for dispersion. The housing (12) can be made of any material that will be impervious to the liquids and solids typically contained within a septic system. Preferably it is made of a plastic material, such as a polyvinyl chloride, polyethylene or polypropylene-type material.

Secured within the filter housing (12) is the filter element holder (20), as shown in FIGS. 1 and 2. This holder (20) is utilized to hold the filter elements (30), which will be discussed in more detail later. The filter element holder (20) is preferably a plate with a top portion (22) and a lip portion (24) which extends downward within the filter housing (12). The lip portion (24) extends downward, running parallel to the inside surface of the side (16) of the filter housing (12) and is securely positioned against the inside surface of the filter housing (12). The bottom edge (26) of the side portion (24) of the filter element holder (20) preferably rests on an inwardly facing dimple element (28) inset on the inside surface of the side (16) of the filter housing (12). When properly secured together, the interaction of the bottom edge (26) of the lip portion (24) of the filter element holder (20) and the inwardly facing dimple (28) of the filter housing (12) prevents effluent from passing from below to above the filter element holder (20) without passing first through at least one of the filter elements (30).

Openings (29) are provided in the top portion (22) of the filter element holder (20) to permit the discharge of filtered effluent which has passed through the filter elements (30). Preferably, these openings (29) in the top portion (22) of the filter element holder (20) line up with openings (39) in the top portion (32) of each of the separate filter elements (30), which are discussed later. No other openings are provided in the top portion (22) of the filter element holder (20) outside of these openings (39) in the top of the filter elements (30). By this arrangement, unfiltered effluent is prevented from passing through the filter element holder (20) without first passing through one or more of the filter elements (30).

In a preferred embodiment there is secured to the filter element holder (20) an extended shaft (50) with handle (52). The handle (52) of this shaft (50) extends above the top (14) of the filter housing (12). This shaft (50) is secured through the top (14) of the filter housing (12) to the filter element holder (20) and preferably to at least one of the filter elements (30) to permit the efficient and quick removal of the filter element holder (20) and filter elements (30), secured to the filter element holder (20) from the filter housing (12), for replacement and cleaning. Preferably the shaft (50) and handle (52) are hollow to permit gases which have passed through the filter element holder (20) to be discharged back into the septic tank rather than discharging out the discharge opening (46). To permit this discharge an inlet opening (54) is provided to the inside of the shaft (50), which inlet opening (54) is in communication with openings in the handle (52) to permit the discharge of gas from the filter system (10) back into the septic tank. The shaft (50) is closed at its bottom (56), preferably by a cap (58), to prevent the flow of effluent up the shaft (50).

A plurality of filter elements (30) are secured to the filter element holder (20). Although any number of different patterns for the arrangement of the filter elements (30) can be utilized, preferably a single central filter element (40) is surrounded by a plurality of surrounding filter elements (42). Preferably, a plurality of at least four and as many as ten surrounding filter elements (42) surround the central filter element (40).

The shaft (50) preferably extends downward through the central filter element (40) and thus assists in securing the central filter element (40) and the filter element holder (20) together.

Each of the filter elements (30) is designed to filter effluent which passes up through the open bottom (18) of the filter housing (12). The size of these filter elements (30) is not particularly critical as long as it is efficient in filtering solids which may enter the filtering system (10). Preferably, the filter elements are from about 2 to about 8 inches in diameter and from about 4 to about 30 inches in height.

Figure 4:
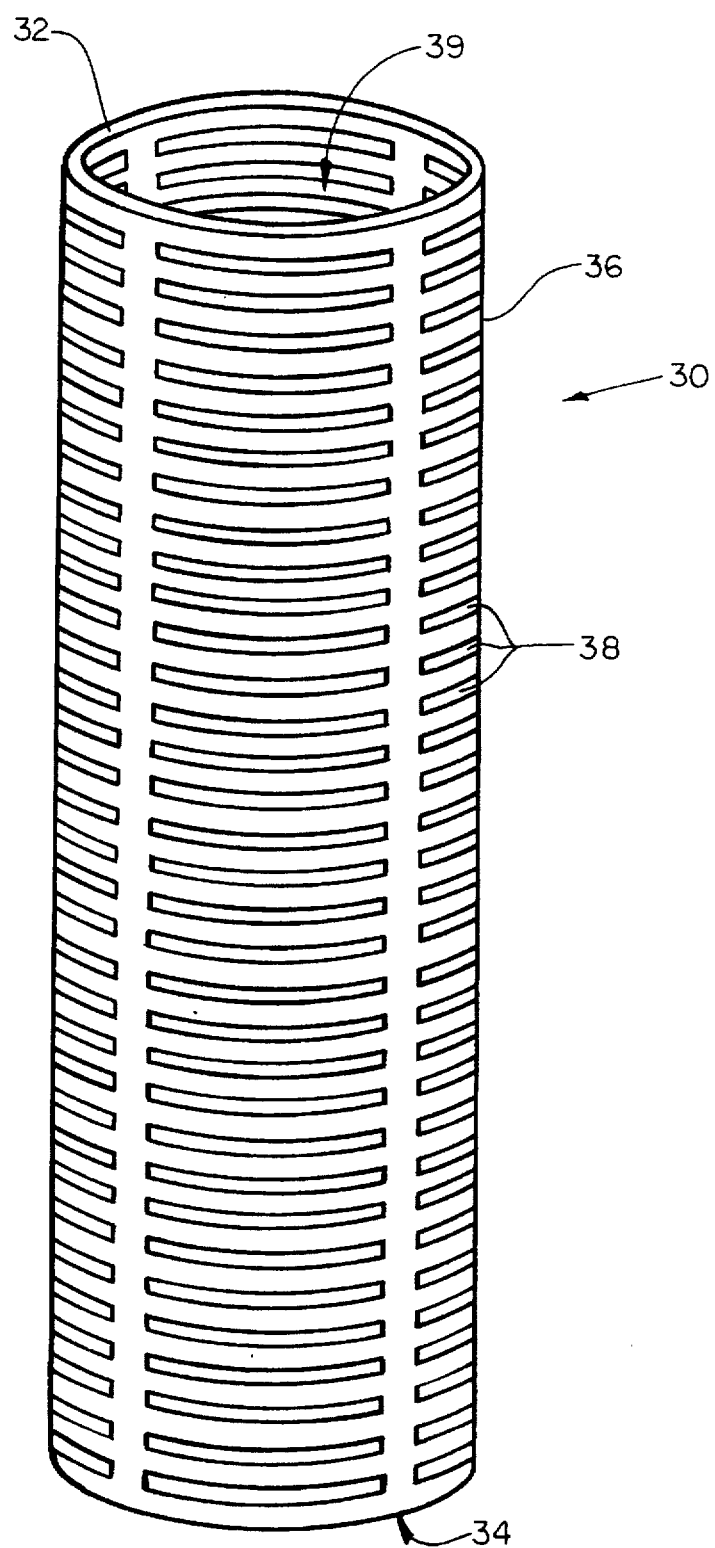
FIG. 4 is a side perspective view of a filter element.

Any method for filtering of the effluent through the filter elements (30) may be utilized. In one preferred embodiment, the filtering is performed by a plurality of horizontal filtering slots (38) cut into the sides (36) of the filter elements (30). See FIGS. 1(a) and 4. Preferably, there are a series of four groups of horizontal filtering slots (38) extending from the bottom (34) of each filter element to its top. Preferably, the slots are no more than about 0.01 inch (0.02 cm) to about 0.25 inch (0.60 cm) in width to be efficient in filtering solids trapped in the liquid effluent. See FIG. 4.

It is critical that each filter element (30) is closed at its bottom end (34). By closing the bottom end (34) of each filter element (30), the unfiltered liquid effluent must pass through the sides (36) of each filter element (30), through the filtering slots (38) and then out through the top (32) of the filter element (30). In one preferred embodiment the bottom end (34) of the filter element is a closed cap (35) secured to the filter element (30) to prevent the flow of effluent through the bottom of the filter element (30). See FIG. 2. The top portion (32) of each filter element (30) is open to permit discharge of the filtered effluent out of the filter elements (30). As previously discussed, openings (29) are provided in the filter element holder (20) which correspond to the openings (39) in the top portion (32) of the filter elements (30) to permit the free flow of the filtered effluent out of the filter housing (12) through the discharge opening (46) as shown in FIG. 1. In addition, as discussed above, there are no other openings in the filter element holder (20) so that the unfiltered liquid effluent may not pass through the filter element holder (20) without first passing through the filtering slots (38) of the filter elements (30).

In order to maintain a consistent flow of effluent through the system, a means is provided to separate the central filter element (40) from the surrounding filter elements (42). This separation means is preferably secured to the central filter element (40) and located a portion of the way above the bottom (34) of the central filter element (40). In one preferred embodiment, this separation means is a plastic ring (44) which is secured to the central filter element (40). See FIG. 1. The size and width of this ring (44) is not particularly critical as long as it is of sufficient size to assure that the surrounding filter elements (42) do not contact the central filter element (40). In a preferred embodiment this ring (44) has an inner diameter approximately equal to the outer diameter of the central filter element (40). In addition, in order that the flow of the effluent through the filter elements is not unduly impeded, this ring (44) is narrow (less than about 0.5 inch (1.2 cm)) and is secured at least about up 10 percent and preferably about 25 percent of the distance up from the bottom (34) of the central filter element (40). By placing the ring (44) a sufficient distance above the bottom (34) of the central filter element (44), the flow of the effluent into the filter elements is not significantly impeded.

Figure 5:
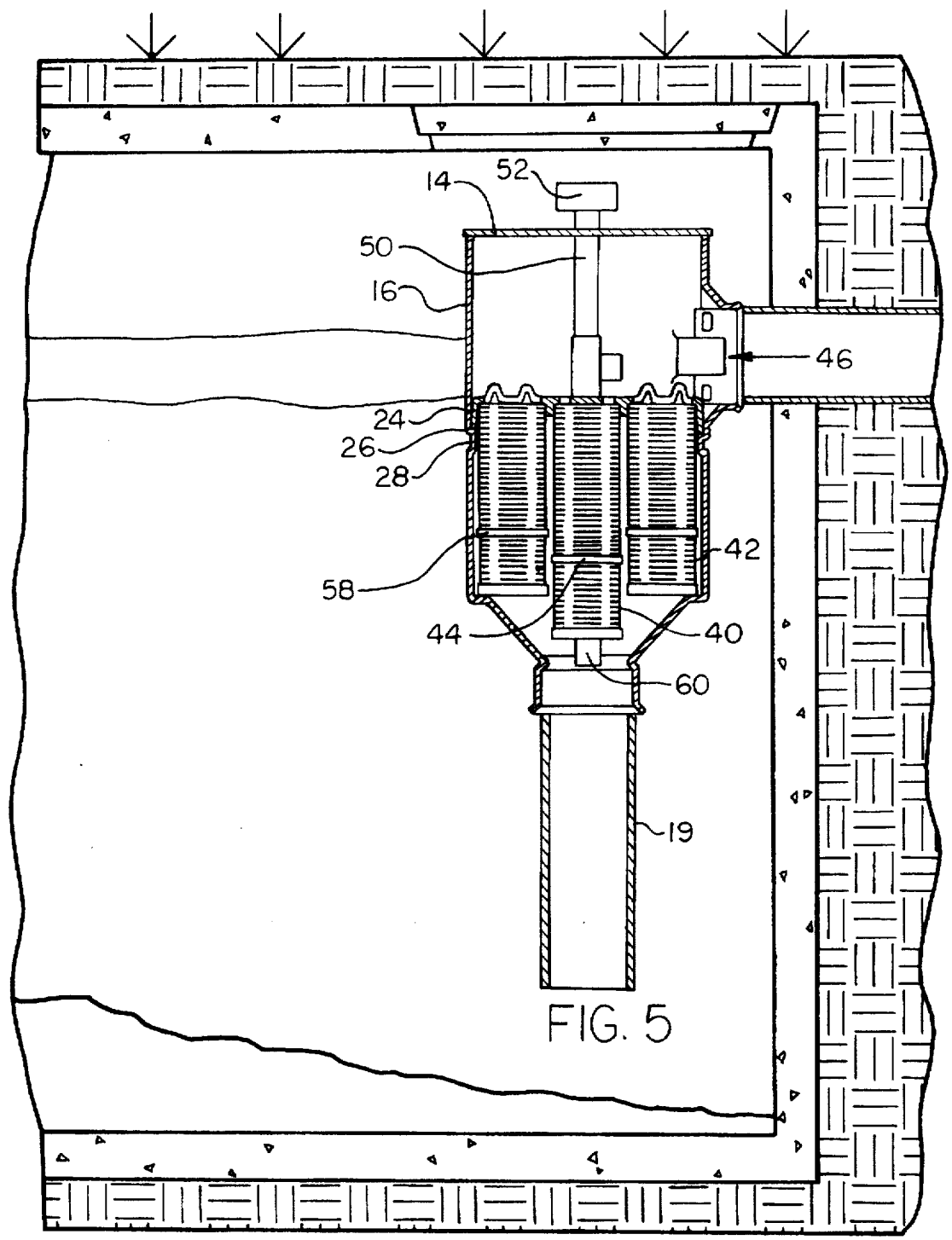
FIG. 5 is a cutaway side view of an alternative embodiment of the filtering system.

In an alternative preferred embodiment as shown in FIG. 5, additional rings (58) are provided on a plurality of the surrounding filter elements (42). For example, in one preferred alternative embodiment, when the surrounding filter elements (42) form a circle around the central filter element (40), a ring is provided around every other surrounding filter element (42). By using this group of rings (58) along with the separation ring (44) on the central filter element, none of the surrounding filter elements (42) will rest against any other filter element. In addition, because these rings are narrow and are located above the bottom of the filter elements (30), there will not be any significant impediment to the flow of the liquid effluent through the filter elements. If preferred, these additional rings (58) may be placed at different heights up the side of the surrounding filter elements (42) as long as they prevent contact of the surrounding filter elements (42) either with themselves or with the central filter element (40).

In a further preferred embodiment as shown in FIGS. 1 and 5, in order to further enhance the filtering ability of the central filter element (40), preferably the length of the central filter element is at least about 20 percent longer than that of the surrounding filter elements (42) such that the central filter element (40) extends downward into the effluent further than the surrounding filter elements (42).

In operation, unfiltered liquid effluent flows from the generally liquid, effluent layer through the open bottom (18) of the filter housing (12) where it first encounters the plurality of filter elements (30). As each of the bottoms (34) of these filter elements (30) is closed, preferably by a cap (35), the effluent flows around to the sides (36) of the filter element (30) where it then passes through the filtering slots (38), contained in the sides (36) of the filter elements (30), to the inside of the filter elements (30). After the effluent passes through the filtering slots (38) inside the filter elements (30), it passes upward and out the opening (39) in the top of the filter elements (20) and through the cooperating opening (29) in the filter element holder (20). Unfiltered effluent may not pass through the top portion (32) of the filter elements (30) or through the filter element holder (20) without first passing through the filtering slots (38) in the filter elements (30) because there are no openings in the filter element holder (20) that do not correspond to openings (39) in the top portion (32) of the various filter elements (30). The liquid effluent is also encouraged to pass through the central filter element (40) by the central filter element preferably extending downward further than the surrounding filter elements (42). Because of the separation ring (44) secured around the central filter element (40), the surrounding filter elements (42) are prevented from contacting the central filter element (40), thereby increasing the flow potential of the effluent among the filter elements (30). In an alternative embodiment as shown in FIG. 5, additional separation rings (58) are secured to a plurality of the surrounding filter elements (42) to prevent them from interacting with each other.

After the effluent passes through the openings (39) in the top of the filter elements and the openings (29) in the filter element holder (20), it then passes out through the discharge opening (46) to be dispersed among the various fields of the septic system.

The filter elements (30) can be checked and cleaned by removing them from the filter housing (12) simply by pulling up on the handle (52) of the shaft (50) which is secured to the filter element holder (20) and the central filter element (40). In addition, gases which pass through the filter elements (30) may be discharged back into the septic tank by passing through a hollow opening (54) contained in the shaft (52) back into the septic tank.

I claim:

1. A filtering system for filtering effluent in a septic system comprising:

a septic tank having an inlet and outlet, and a filter device located at said outlet, said filter device comprising:

(a) a filter housing with sides, a top and an open bottom;

(b) a filter element holder secured to the filter housing;

(c) a discharge opening in the filter housing for discharging filtered effluent from the filter housing;

(d) a plurality of vertically oriented, elongated filter elements, each secured to the filter element holder, each with a top, side and bottom, wherein the bottom of each filter element is closed to prevent flow of effluent through said bottom of the filter element, and wherein each filter element contains a filtering means on its side for filtering solids from the effluent; and (e) a separation means for separating one filter element from other filter elements, which means does not unduly restrict the flow of effluent through the filtering system.

2. The filtering system of claim 1 wherein the filter elements comprise a central filter element surrounded by a plurality of surrounding filter elements.

3. The filtering system of claim 2 wherein the separation means is a ring secured to the central filter element.

4. The filtering system of claim 3 wherein the ring is secured at least about 20 percent above the bottom of the central filter element.

5. The filtering system of claim 1 wherein an open shaft is secured to the filter housing which shaft extends downward below the bottom of the filter elements.

6. The filtering system of claim 2 wherein the filter means comprises a series of slots cut into the sides of the filter elements.

7. The filtering system of claim 1 wherein the filter elements have open tops.

8. The filtering system of claim 7 wherein openings are provided in the filter element holder which are located adjacent to the open tops of the filter elements.

9. The filtering system of claim 2 wherein the central filter element extends downward further than the plurality of surrounding filter elements.

10. The filtering system of claim 1 wherein the filter element holder is secured against the sides of the filter housing to cause the effluent from outside of the filter housing to flow through the filter elements before discharging through the discharge opening.

11. The filtering system of claim 6 wherein the flow of the effluent is through the series of slots cut into the sides of the filter element upward through an opening in the top of the filter element and through an opening provided in the filter element holder.

12. The filtering system of claim 2 wherein the separation means is a plurality of rings.

13. The filtering system of claim 12 wherein one of the rings is secured to the central filter element.

14. The filtering system of claim 12 wherein sufficient rings as secured to the filter elements to prevent physical contact of the individual filter elements.

15. The filtering system of claim 12 wherein none of the rings are in contact with any other of the rings.

16. The filtering system of claim 1 wherein a handle with shaft is secured to the filter element holder.

17. The filtering system of claim 10 wherein the filter element holder rests against an inwardly facing dimple in the sides of the filter housing.

* * * * *